(12) United States Patent
Aigner et al.

(10) Patent No.: US 7,371,065 B2
(45) Date of Patent: May 13, 2008

(54) APPARATUS AND METHOD FOR THE CONTROLLED PRODUCTION OF NANO-SOOT PARTICLES

(75) Inventors: Manfred Aigner, Stuttgart (DE); Claus Wahl, Vaihingen-Enz (DE); Veronique Krueger, Stuttgart (DE)

(73) Assignee: Deutsches Zentrum fur Luft -und Raumfahrt E.V., Bonn (DE)

( * ) Notice: Subject to any disclaimer, the term of this patent is extended or adjusted under 35 U.S.C. 154(b) by 0 days.

(21) Appl. No.: 11/077,591

(22) Filed: Mar. 11, 2005

(65) Prior Publication Data

US 2006/0068350 A1 Mar. 30, 2006

Related U.S. Application Data

(63) Continuation of application No. PCT/EP03/10105, filed on Sep. 11, 2003.

(30) Foreign Application Priority Data

Sep. 13, 2002 (DE) .............................. 102 43 307

(51) Int. Cl.
*F23D 3/40* (2006.01)
*F23N 5/00* (2006.01)

(52) U.S. Cl. .......................... 431/326; 431/76; 431/12; 431/7

(58) Field of Classification Search ................ 431/326, 431/7, 12, 170, 76
See application file for complete search history.

(56) References Cited

U.S. PATENT DOCUMENTS 4,250,145 A 2/1981 Pobst, Jr. et al.
4,316,881 A 2/1982 Pobst, Jr. et al.
4,673,349 A 6/1987 Abe et al.
5,103,789 A * 4/1992 Hartman et al. ............. 123/435
6,946,101 B1 * 9/2005 Jing ........................... 422/150
2001/0019814 A1 * 9/2001 Fastnacht et al. ............ 431/76
2003/0044342 A1 * 3/2003 Alford et al. ............ 423/445 R

FOREIGN PATENT DOCUMENTS

| EP | 1 055 877 A1 | 11/2000 |
|---|---|---|
| GB | 2 259 566 A | 3/1993 |
| JP | 63 319045 A | 12/1988 |
| WO | WO 03/021015 A1 | 3/2003 |
| WO | WO 03/050040 A1 | 6/2003 |

OTHER PUBLICATIONS

Jing, Lianpeng, "Generation of Combustion Soot Particles for Calibration Purposes", 2nd ETH Workshop "Nanoparticle Measurement", Aug. 7, 1998, pp. 1-4, Hönggerberg Zürich.
"Cast Combustion Aerosol Standard", Matter Engineering AG, Jan. 23, 2001, pp. 1-4.
Wannemacher, G., "Tests for the Formation of Soot in Burner-stabilized Hydrocarbon-Oxygen Flames", Dissertation, Jul. 4, 1983.

* cited by examiner

*Primary Examiner*—Alfred Basichas
(74) *Attorney, Agent, or Firm*—Alston & Bird LLP

(57) ABSTRACT

In order to provide an apparatus for the controlled production of nano-soot particles, a pore burner and a mixing device for the production of a pre-mixture of fuel and oxidizing agent are provided, wherein the mixing device is coupled to the pore burner so that the pre-mixture can be supplied to it.

23 Claims, 4 Drawing Sheets

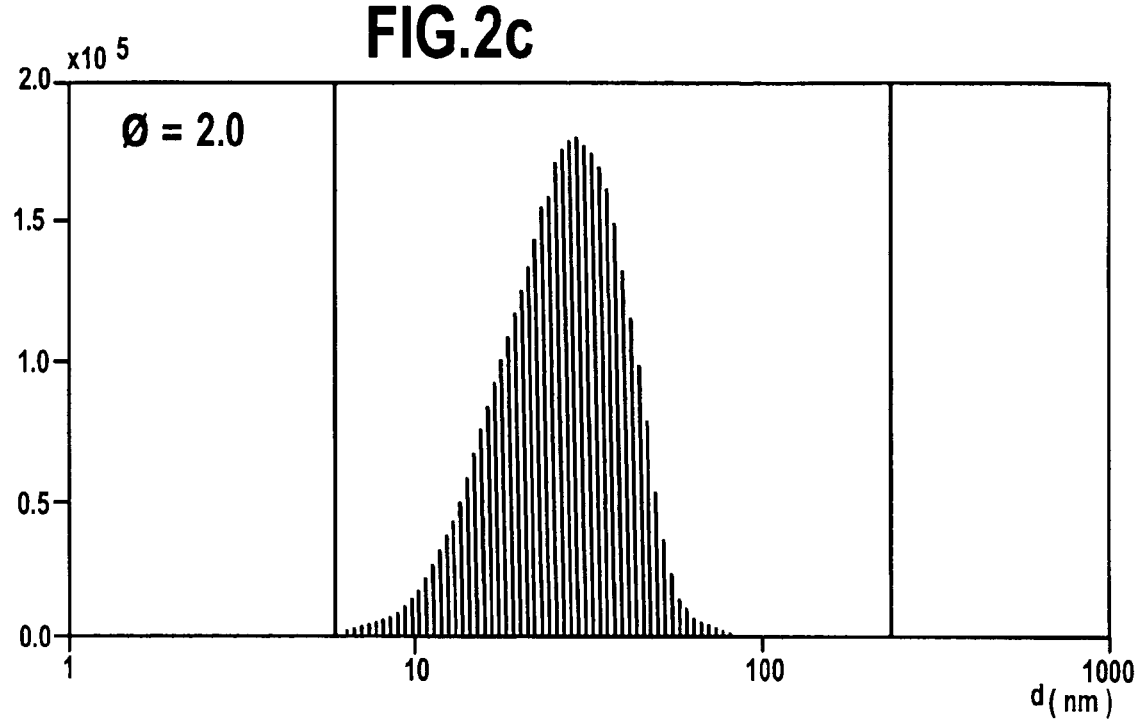
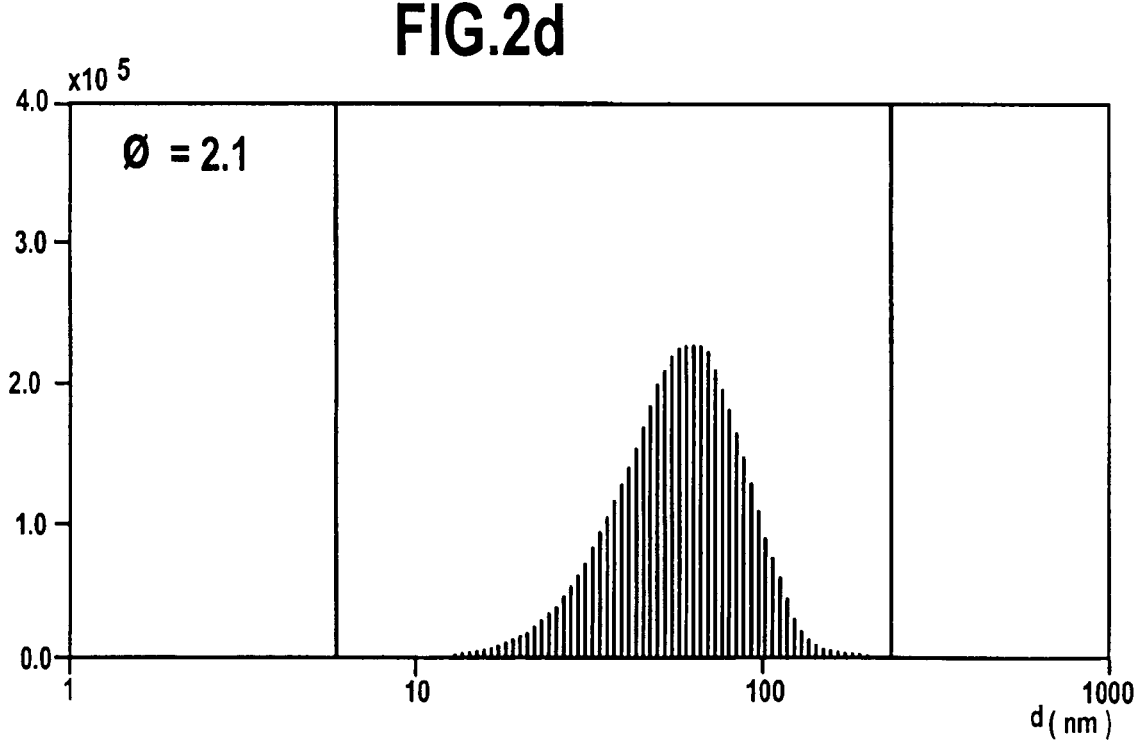

APPARATUS AND METHOD FOR THE CONTROLLED PRODUCTION OF NANO-SOOT PARTICLES

CROSS REFERENCE TO RELATED APPLICATIONS

The present application is a continuation of international application PCT/EP2003/010105, filed on Sep. 11, 2003, and also claims the benefit of German Application No. 102 43 307.0, filed Sep. 13, 2002, both of which are incorporated herein by reference in their entirety and for all purposes.

FIELD OF THE INVENTION

The invention relates to an apparatus and a method for the controlled production of nano-soot particles.

BACKGROUND OF THE INVENTION

The degree of effectiveness of gas turbines and internal combustion engines may be increased and the burn out improved by means of high-pressure direct injection. However, fine soot particles (carbon black particles) with sizes in the nanometer range result. Typical average diameters of the particles are between 15 nm and 120 nm with concentrations between $10^4$ to $10^8$ particles per $cm^3$.

The emission of such soot particles can lead to problems. In order to be able, for example, to study the biological effects of such soot particles, a source of soot particles must be present.

A generator for soot particles is known from the state of the art (Matter Engineering AG, Wohlen, Switzerland), with which the soot particles are produced in a diffusion flame and the stream of particles is mixed with a quenching gas in order to prevent further combustion processes in the stream of particles and to stabilize the soot particles.

SUMMARY OF THE INVENTION

In accordance with the invention, an apparatus and a method for the controlled production of nano-soot particles are provided, with which soot particles of a defined size can be produced in a reproducible manner. In accordance with the invention, the apparatus—the soot generator—comprises a pore burner and a mixing device for the production of a pre-mixture of fuel and oxidizing agent, wherein the mixing device is coupled to the pore burner so that the pre-mixture can be supplied to it.

As a result of a pre-mixture being supplied to the pore burner, it is possible to reduce the mass ratio gradients during the combustion. The average particle diameter of the nano-soot particles produced may be adjusted directly via the mixture of oxidizing agent and fuel. A high reproducibility with respect to the combustion is obtained and, therefore, with respect to the production of soot particles.

A homogeneous combustion zone and, therefore, soot forming zone may be formed by means of the pore burner, wherein the homogeneity with respect to space and time can be guaranteed. As a result, the combustion zone and, therefore, the soot forming zone can be stabilized and, as a result, nano-soot particles of a defined size can be produced. The average diameter of the nano-soot particles produced may be adjusted by way of adjustment of the mixing ratio. It is provided, in particular, for the production of nano-soot particles to be controlled with respect to size and/or concentration.

A homogeneous combustion without any stoichiometry gradients may be achieved when the pore burner is following downstream from the mixing device. As a result, a homogeneous soot forming zone may be formed so that, again, nano-soot particles with a defined size distribution are formed.

In a constructionally simple embodiment, the mixing device is formed by a mixing path of a corresponding length in order to provide for a homogeneous pre-mixing of fuel and oxidizing agent prior to entering the pore burner.

The corresponding ratio of fuel and oxidizing agent in the pre-mixture may be adjusted in a simple manner when a mass flow regulator is provided for adjusting the mass flow of fuel to the mixing device. For the same reason it is favorable when a mass flow regulator is provided for adjusting the mass flow of oxidizing agent to the mixing device. The stoichiometry ratio may be adjusted by way of corresponding adjustment of the mass flows and, therefore, of the ratio of the mass flows. With a ratio ($\Phi$) of fuel to oxidizing agent of larger than 1, a rich mixture is obtained, during the combustion of which soot particles are formed.

Instead of mass flow regulators for oxidizing agent and fuel, other flow-limiting elements, such as, e.g., critical nozzles, may also be used, with different pairs of flow-limiting, critical nozzles for different stoichiometries. One preferred embodiment provides for switchable pairs of critical nozzles so that other stoichiometries and, therefore, other particle diameters, or rather particle size distributions, can be set by way of a simple switching over to other critical nozzles.

In order to form a homogeneous combustion zone and, therefore, soot forming zone it is favorable when the pore burner comprises a distribution chamber which is coupled to the mixing device and which is limited by a pore plate. The homogeneous pre-mixture consisting of fuel and oxidizing agent may then be guided into a spatial area via a mixing chamber of the mixing device in order to provide for a stable flame formation in this way and, therefore, for a reproducible formation of soot particles.

It is favorable when the distribution chamber is of a cylindrical design since a defined combustion zone may be formed in this way which can be protected in a simple manner with respect to the penetration of air from the side and the penetration of air from above in order to, again, avoid mass ratio gradients at the edge of the combustion zone.

It is particularly advantageous when a baffle plate is arranged at a distance in relation to a pore plate of the pore burner. A flame can then burn against this baffle plate, whereby the flame is stabilized since any flickering is prohibited. This stabilization of the flame ensures a stable soot forming zone which is homogeneous with respect to space and time. It is favorable when the baffle plate is arranged parallel to the pore plate in order to achieve a stable flame formation. Furthermore, it is favorable when the baffle plate has a circular cross section in order to be able to form a stable and homogeneous soot forming zone in this way. In addition, it is favorable when the baffle plate has a greater diameter than the pore plate. As a result, it is possible for a mass ratio gradient to also be avoided to a great extent at the edge of the combustion zone so that, again, the soot forming zone is essentially homogeneous right up to its edge area.

Furthermore, it is favorable when a distribution chamber for inert gas is arranged around the distribution chamber for the mixture of fuel and oxidizing agent. A flow of inert gas (co-flow) may then be formed around the combustion zone, for example, in the form of an annular flow via this distribution chamber. This flow prevents air penetrating into the combustion zone from the side and, therefore, ensures homogeneity of the soot forming zone on account of the formation of mass ratio gradients being prevented.

It is favorable when the distribution chamber for inert gas is of a ring-shaped design in order to be able to enclose the combustion zone by means of the co-flow of inert gas in the case of a ring-shaped pore plate. Inert gas can then flow out around a combustion zone by means of the distribution chamber in order to protect this combustion zone against any air entering from the side.

In addition, it is favorable when a flue or chimney is provided which is arranged, in particular, above the baffle plate. A draft may be brought about by means of such a flue or chimney and this provides for an additional stabilization of the flame and, therefore, ensures the homogeneity of the soot forming zone. As a result of the flue or chimney, air is, in particular, prevented from being able to flow into the combustion zone from above which could lead to inhomogeneous stoichiometry ratios.

In accordance with the invention, it may be provided for a partial flow of produced soot particles to be coupled out; since only a partial flow is coupled out, the flame is not essentially disturbed and so stable, reproducible ratios prevail in the combustion zone. The partial flow can, in particular, be coupled out of a central area of a combustion chamber where a high degree of homogenization with respect to the formation of soot is ensured.

A probe device for coupling out soot particles can be provided, via which soot particles may be coupled out of a central area of the combustion zone. In this respect, an entry aperture of the probe device is positioned, in particular, at a probe tip at a distance in relation to a pore plate of the pore burner with respect to a vertical direction. Furthermore, the entry aperture of the probe device is arranged between a pore plate of the pore burner and a baffle plate; it is favorable when the entry opening of the probe device is positioned at or in the vicinity of a central area of a combustion zone above a pore plate of the pore burner. A partial flow may then be taken from a center (with respect to the radial distance to an axis) of a spatially extended, homogeneous combustion zone. As a result, a narrow, mono-mode distribution of soot particles is obtained in the partial flow of soot particle aerosol which is coupled out. It has proven to be favorable when an entry aperture of the probe device has a diameter of at least 1.5 mm, and preferably 2 mm, in order to avoid any blockage of the entry aperture as a result of soot particles.

For the simple coupling out of the partial flow, the probe device has a suction device for drawing the partial flow out of a combustion zone by suction. This suction device may have, for example, an ejector in order to make the necessary underpressure available in the manner of a water-jet vacuum pump for drawing the soot particles out of the soot forming zone by way of suction.

In addition, it is favorable when a diluting device for the controlled production of nano-soot particles is provided, by means of which a defined concentration of soot particles can be adjusted. As a result of the soot particle generator, the particle size of the soot particles produced and the concentration of the soot particles in a soot particle aerosol may be adjusted in a broad range.

Furthermore, it is favorable when an analyzer device and/or filter device for soot particles is provided, wherein analyzer device and filter device can be integrated into one piece of apparatus. The soot particles produced in a controlled manner may be characterized via the analyzer device; soot particles of a specific size may be filtered out via the filter device in a narrow distribution range.

The analyzer device and/or filter device comprises, in particular, an electrostatic classifier. In the case of such an electrostatic classifier, the soot particles are charged, for example, by means of a radioactive source and then pass through an electric field. Their movability in this electric field (electrostatic movability) depends on their size. The size distribution of the nano-soot particles produced may be determined by way of the determination of the movability, for example, via a distance determination. The movability may, however, also be used for the purpose of filtering out soot particles of a specific size in order to obtain a monodisperse distribution in this way and, for example, to make available nano-soot particles of a specific average diameter with a narrow distribution for an application. It may be provided for the analyzer device and/or filter device to comprise a condensation particle counter. In an optical manner, a size distribution may then also be determined optically in the case of soot particles with sizes in the nanometer range.

A control device may also be provided, by means of which a composition of the mixture of fuel and oxidizing agent can be controlled in order to obtain a defined, average particle size in the case of a specific presetting of $\Phi$. The composition of the mixture can be controlled, in particular, as a function of a measured particle size of soot particles produced. On account of the high reproducibility of the distribution of soot particles in the case of the controlled production with the device, a regulator circuit, with which the analyzer device measures the particle size distribution and passes these values to the control device, can be set up when, for example, soot particles with a specific, average diameter are required for an application. This device again regulates the mass flows for the formation of the mixture in such a manner that the desired particle size distribution is achieved.

In accordance with the invention, a method for the controlled production of nano-soot particles is provided, wherein a premixed mixture of fuel and oxidizing agent is burned by a pore burner. As a result, a stable and homogeneous combustion zone and, therefore, soot forming zone may be formed, wherein an average soot particle size can be set by way of adjustment of the mixing ratio. Stoichiometry gradients may be avoided to a great extent and so reproducible conditions again prevail.

Additional advantages of the method in accordance with the invention have already been explained in connection with the apparatus in accordance with the invention. Additional advantageous embodiments have likewise already been explained in connection with the apparatus in accordance with the invention.

The following description of a preferred embodiment serves to explain the invention in greater detail in connection with the drawings.

BRIEF DESCRIPTION OF THE DRAWINGS

A preferred exemplary embodiment of the invention is explained in more detail hereinbelow with reference to schematic drawings, in which.

DETAILED DESCRIPTION OF THE INVENTION

The present invention now will be described more fully hereinafter. However, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
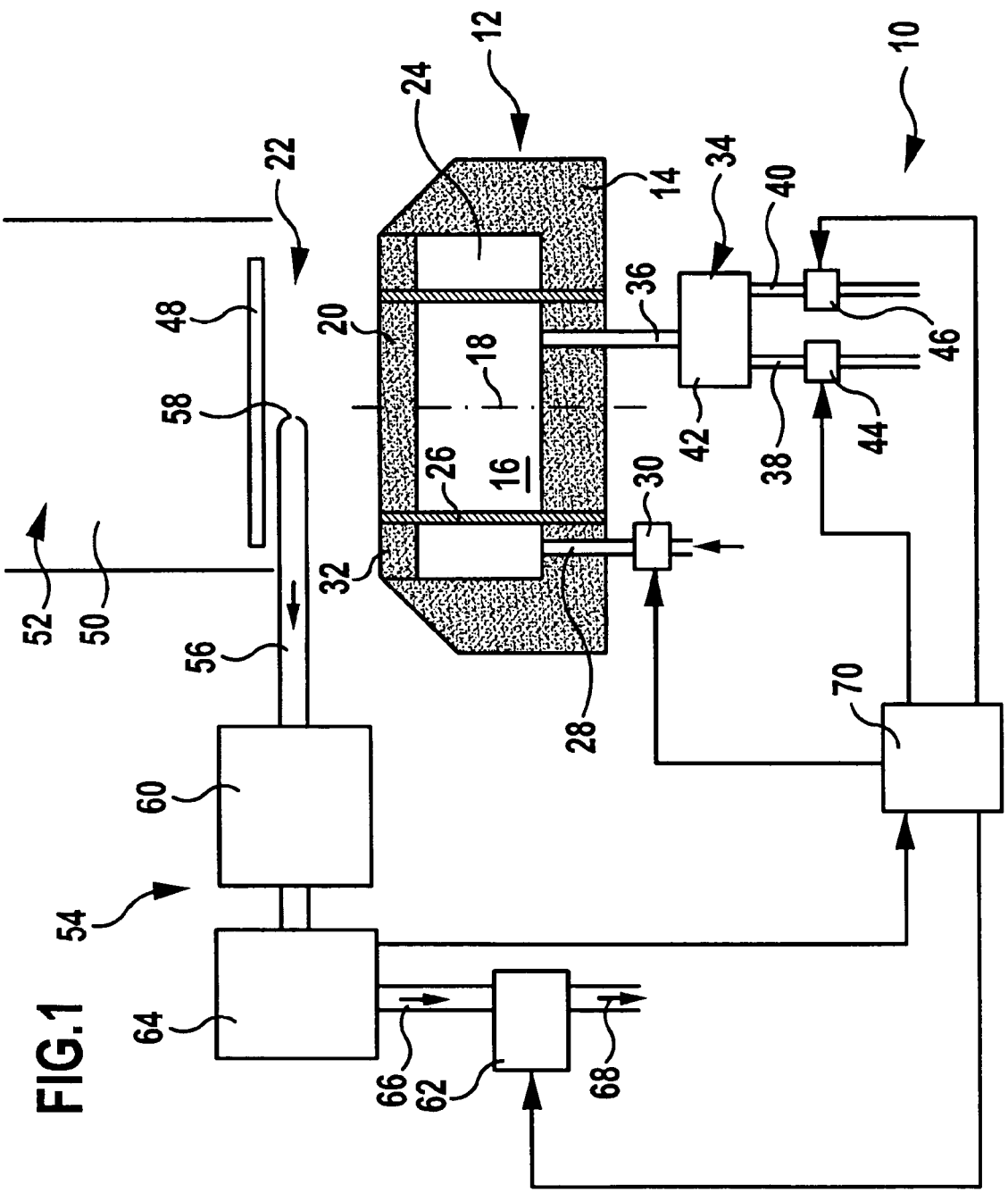
FIG. 1 shows a schematic illustration of an embodiment of an apparatus in accordance with the invention for the controlled production of nano-soot particles (i.e., a soot generator)
Figure 2A:
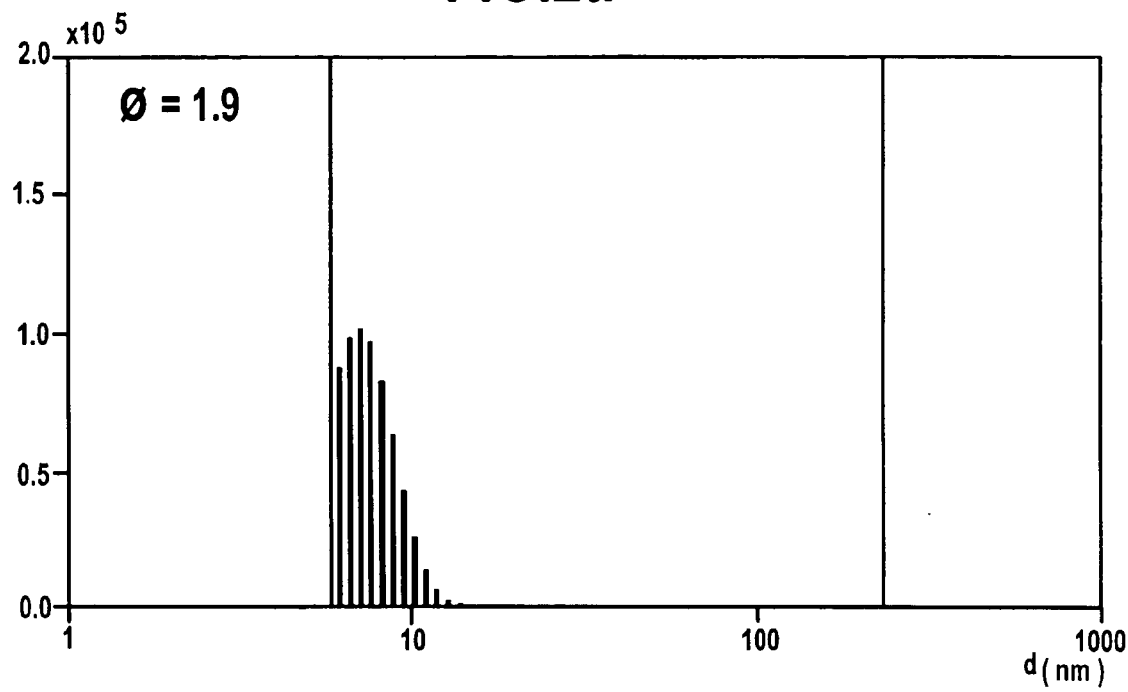
FIGS. 2 (a) to (f) show measurement diagrams of size distributions (number over diameter) of nano-soot particles produced at different ratios Φ, where Φ is the ratio of fuel to oxidizing agent (Φ=1 denotes stoichiometric combustion).
Figure 2B:
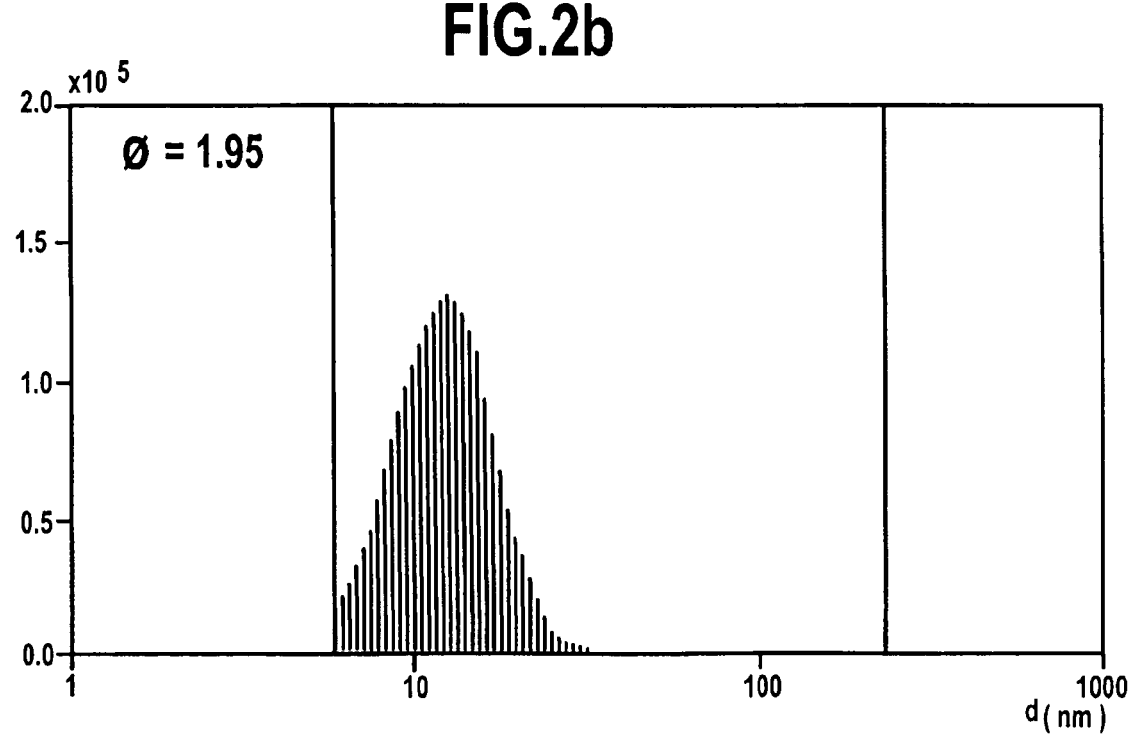
Figure 2E:
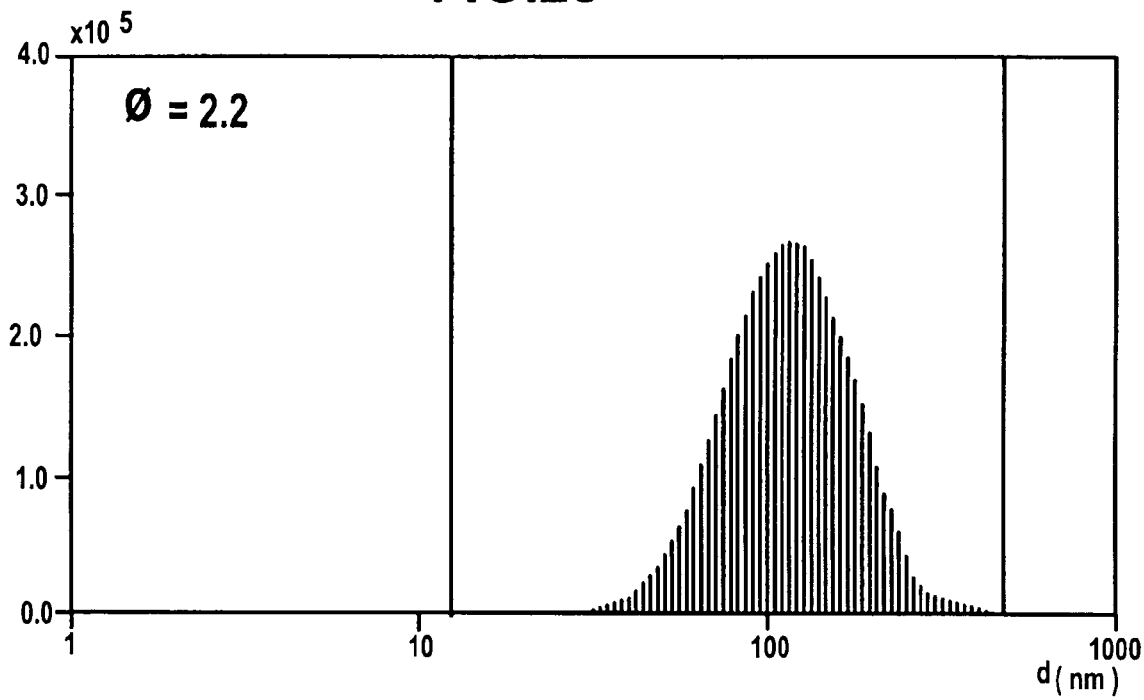
Figure 2F:
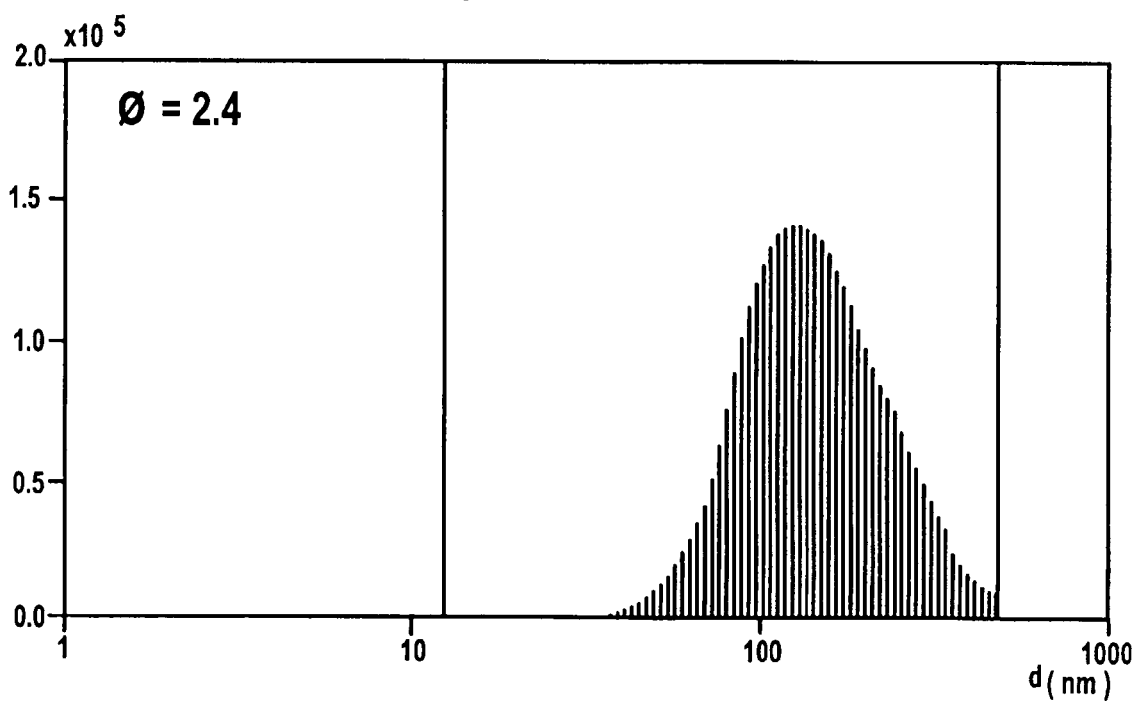

One embodiment of an apparatus in accordance with the invention for the controlled production of nano-soot particles, which is designated in FIG. 1 as 10, comprises a pore burner 12 with a housing 14, in which a distribution chamber 16 is formed. This distribution chamber 16 is of a cylindrical design with an axis 18 and is covered by a pore plate 20. The pore plate 20 is provided with pores which facilitate a passage of gas from the distribution chamber 16 into a combustion zone 22 arranged above the pore plate 20, wherein the gas can be guided into the combustion zone 22 uniformly over the surface of the pore plate 20 from the distribution chamber 16. Any flashback of the combustion of a gas to the distribution chamber 16 is prevented by the pore plate 20.

The pore plate 20 is produced, in particular, from a metallic material such as bronze, wherein the pores are formed by sintering metal beads. It may be provided for cooling channels for the purpose of cooling to be arranged in the pore plate 20. The pore plate 20 is designed as a disk with a circular cross section. The diameter is greater than that of the distribution chamber 16. It also covers, apart from the distribution chamber 16, an annular chamber 24 which is arranged around the distribution chamber 16, wherein this annular chamber 24 is separated from the distribution chamber 16 in a gas-tight manner via an annular wall 26.

A flow of an inert gas around the combustion zone 22 may be formed via the annular chamber 24. For this purpose, a supply channel 28 leads into the annular chamber 24, in particular, from a side facing away from the pore plate 20. The mass flow of inert gas into the annular chamber 24 may be controlled via a mass flow regulator 30 and, as a result, the rate of flow of inert gas, such as nitrogen, through an annular chamber area 32 of the pore plate 20 may be controlled.

A mixture comprising a fuel, which may be, in particular, a gaseous hydrocarbon such as methane, ethane, ethene, ethyne, propane, propene, propyne, butane, cyclobutene, butyne, etc., and an oxidizing agent, such as air or a mixture of oxygen and inert gas, is supplied to the distribution chamber 16 for the purpose of producing nano-soot particles. Higher-boiling and, in particular, liquid hydrocarbons can also be used when they are volatilized beforehand. For this purpose, a mixing device 34 is connected upstream of the pore burner 12 and in this mixing device a pre-mixture consisting of the fuel and the oxidizing agent is generated. The mixing device 34 is formed, for example, by a mixing path of a corresponding length, in which fuel and oxidizing agent can be mixed. The pre-mixture is then coupled into the distribution chamber 16 of the pore burner 12 via a supply line 36, wherein the supply line 36 is preferably connected to a side of the pore burner 12 located opposite the pore plate 20.

In order to generate the pre-mixture consisting of fuel and oxidizing agent, which is then supplied to the pore burner 12, in the mixing device 34, a supply line 38 for fuel and a supply line for oxidizing agent 40 are coupled to the mixing device in order to generate the pre-mixture in a mixing chamber 42 of the mixing device 34. The amount of fuel supplied to the mixing device 34 can be adjusted via a mass flow regulator 44 and the amount of oxidizing agent supplied to the mixing device 34 can be adjusted via a mass flow regulator 46.

In order to produce nano-soot particles during the combustion of the fuel, the proportion of fuel must be greater than that of the oxidizing agent so that the combustion takes place with a surplus of fuel. The corresponding ratio is characterized by the symbol Φ. At Φ>1, a rich mixture is present, during the combustion of which soot can be formed; Φ=1 denotes a stoichiometric combustion.

A baffle plate 48 is arranged above the pore plate 20 and this is designed, in particular, as a circular disk which is arranged concentrically to the axis 18 of the pore burner 12. A combustion flame for the combustion of the fuel burns against this baffle plate 48 which therefore stabilizes the flame and prevents any flickering of the flame. The baffle plate 48 preferably has a diameter which is greater than the diameter of the distribution chamber 16 so that, upwards, this is covered completely. A flue pipe 50 is, in addition, arranged above the pore plate 20 for forming a flue 52 in order to provide for an additional stabilization of the combustion flame by forming a draft.

A method for the controlled production of nano-soot particles functions in accordance with a preferred embodiment of the invention is described below.

A defined pre-mixture comprising, and preferably consisting entirely of, fuel and oxidizing agent is produced via the mixing device 34, wherein a defined mixture composition and, therefore, defined mass ratios in the mixture are set by way of adjustment of the corresponding mass flows at the mass flow regulators 44 and 46. The homogeneous mixture produced is then guided via the supply line 36 to the distribution chamber 16 where it flows via the pore plate 20 over the cross section of the distribution chamber 16 into the combustion zone 22 where combustion takes place (when a flame is lit).

Inert gas, such as nitrogen, flows upwards out of the annular chamber 24 through the annular chamber area 32 of the pore plate 20. This flow surrounds the combustion zone 22 and therefore prevents any air from entering the combustion zone 22. Any entry of air from above into the combustion zone 22 is prevented to a great extent by the flue 52.

No stoichiometry gradients result in the combustion zone 22 as a result of a pre-mixture of fuel and oxidizing agent being supplied and so a "premixed" flame results. The size of the resulting nano-soot particles can be adjusted via the ratio of the proportion of fuel and oxidizing agent in the mixture, adjusted via the mass flow regulators 44 and 46. Thus, reproducible combustion conditions may be set and, therefore, nano-soot particles with a reproducible size may be produced.

The baffle plate 48 in conjunction, in particular, with the flue 52 and the annular flow of inert gas around the combustion zone 22 provides for a stable soot forming zone which is homogeneous with respect to space and time. The soot forming zone has a high degree of constancy with respect to the mass ratios right up to its edge, and the flow of inert gas out of the annular chamber 24 also provides for homogeneity at the edge areas of the combustion zone 22.

The soot particles produced are discharged out of the combustion zone 22 in a partial flow in order to disturb the combustion processes as little as possible, i.e., in order not to disturb the flame, in particular. This also contributes to the formation of stable, reproducible combustion ratios, whereby a reproducible production of soot particles is again achieved.

A partial flow of combustion exhaust gas laden with particles is removed via a probe device 54 which comprises a coupling-out probe 56 which projects into the combustion zone 22 between the baffle plate 48 and the pore plate 20. In this respect, the coupling-out probe 56 is preferably arranged closer to the baffle plate 48 than to the pore plate 20. The coupling-out probe 56 has an entry aperture 58, through which the combustion exhaust gases laden with soot particles can be removed. In one embodiment, with which the distributions according to FIG. 2 have been measured, the diameter of this entry aperture 58 is equal to or greater than 2.1 mm in order to avoid any blockage. In an area which adjoins the entry aperture 58, an inner diameter of the coupling-out probe 56 is greater than the diameter of this entry aperture 58. The coupling-out probe 56 is arranged such that the entry aperture 58 is located in a central area of the combustion zone and, in particular, at or in the vicinity of the axis 18.

The probe device 54 comprises a suction device 60 such as, for example, an ejector, in order to generate the underpressure required in order to draw off the soot particle aerosol by suction.

The probe device 54 can be arranged upstream of a diluting device 62 in order to adjust a corresponding concentration of numbers of soot particles in the aerosol. The diluting device 62 may comprise several, in particular, controllable diluting stages.

An analyzer device 64 and/or filter device may be provided for measuring the particle size of the nano-soot particles produced and drawn off by suction in the partial aerosol flow. The analyzer device and the filter device may, in particular, be combined in one device. The analyzer device 64 or filter device comprises, for example, an electrostatic classifier which characterizes the soot particles in accordance with their electric mobility.

An electrostatic classifier separates the particles according to their size in order to be able to determine the distribution of the particle size with a high resolution in this way. Such electrostatic classifiers are known, for example, under the name Model 3081 Long DMA of the company TSI, St. Paul, Minn., USA. In this respect, the aerosol laden with soot particles is guided past a radioactive source, whereby particles are charged. Subsequently, the particles are separated in a mobility analyzer in accordance with their electric mobility. As a result, the particle size may be analyzed. On the other hand, soot particles of a specific size may also be filtered out as a result of the separation.

When using an SMPS system (SMPS—Scanning Mobility Particle Sizer), the mono-disperse aerosol generated in the analyzer is supplied to a condensation particle counter so that the number of particles may be measured for each particle size. The size distribution in the soot particle aerosol drawn off by suction may be determined by means of a corresponding scanning procedure over the particle sizes.

When using the analyzer device 64 as a filter device, soot particles of a specific mobility—and, therefore, also of a specific size—are filtered out so that an exit stream 66 of nano-soot particles is obtained which has a very narrow size distribution.

The concentration of the soot particles in a stream of air 68 may then be adjusted via the post-connected diluting device 62. The stream of air 68 then comprises soot particles of a specific size with an adjustable distribution narrowness about a specific size.

In accordance with the invention, a control device 70 may be provided, via which the mass flow of fuel and oxidizing agent through the mass flow regulators 44 and 46 and, therefore, the stoichiometry ratio in the pre-mixture can be adjusted. Likewise, the mass flow of inert gas through the annular chamber 24 can be adjusted by means of the control device 70 via the mass flow regulator 30. The control device 70 is, in particular, in communication with the analyzer device/filter device 64 in order to control the filtering, for example, such that the aerosol stream of air 68 contains soot particles of a specific size with a narrow size distribution.

It may also be provided for the analyzer device/filter device 64 to pass its measurement results with respect to the size distribution of the soot particles in the extracted aerosol to the control device 70. If this size distribution does not correspond to a desired specification, when, for example, the maximum does not correspond to a specification maximum, the control device 70 can alter the mixing ratio of the pre-mixture in order to obtain the desired distribution. The regulating parameter is, in this respect, the mixing ratio and, in particular, $\Phi$, wherein this ratio is adjusted via the mass flow regulators 44, 46. This regulating procedure is controlled by the measurement result of the analyzer device/filter device 64.

The control device 70 can also control the dilution of the soot particles in the diluting device 62 in order to obtain a stream of air 68 of a predetermined concentration with soot particles of a predetermined size with a narrow distribution.

For the controlled production of nano-soot particles, the ratio $\Phi$ of fuel to air (when air is used as oxidizing agent) is adjusted to a value of greater than 1 so that a rich pre-mixture is obtained. Depending on the size of $\Phi$, soot particles with an average diameter of, for example, between detectable 5 nm to 200 nm or more may be regulated, wherein this average diameter of the soot particles can be freely adjusted in large ranges via the ratio $\Phi$. Smaller soot particles may also be produced.

Corresponding measurement diagrams are shown in FIGS. 2 (a) to (f). The entry aperture 58 has, in this respect, been positioned at a height of 10 mm above the pore plate 20 at the axis 18. The size distribution of the soot particles is shown in the measurement diagrams, wherein this size distribution has been measured via an electrostatic classifier. At $\Phi=1.9$, the maximum of the size distribution with the use of ethene as fuel is at approximately 7 nm. With an increase in $\Phi$, the maximum migrates towards larger diameters; at $\Phi=2.4$, the maximum is at approximately 200 nm.

As a result of the method for the controlled production of nano-soot particles with the aid of the apparatus in accordance with the invention, soot particles of a defined size can be produced in a reproducible manner. On account of the defined distributions of the soot particle sizes, as shown in the measurement diagrams according to FIG. 2, filtering can also take place in order to produce a mono-disperse aerosol stream of soot particles from a monomode distribution.

Many modifications and other embodiments of the inventions set forth herein will come to mind to one skilled in the art to which these inventions pertain having the benefit of the teachings presented in the foregoing description. Therefore, it is to be understood that the inventions are not to be limited to the specific embodiments disclosed and that modifications and other embodiments are intended to be included within That which is claimed:

1. Apparatus for the controlled production of nano-soot particles, comprising:
   a pore burner comprising a combustion zone arranged above a pore plate;
   a mixing device adapted for the production of a pre-mixture of fuel and oxidizing agent;
   wherein said mixing device is coupled to the pore burner such that the pre-mixture can be supplied thereto;
   a probe device for coupling out a partial flow of produced nano-soot particles;
   an analyzer device for measuring the particle size of the nano-soot particles within the partial flow coupled out by the probe device;
   a control device for controlling the mixture of fuel and oxidizing agent, wherein the control device is in communication with the analyzer device and adapted for controlling the mixture of fuel and oxidizing agent as a function of the particle size measured by the analyzer device;
   wherein the probe device has a suction device for drawing the partial flow out of the combustion zone by suction; and
   wherein an entry aperture of the probe device is positioned at or in the vicinity of a central area of the combustion zone.

2. Apparatus as defined in claim 1, wherein the production of nano-soot particles is controlled with respect to at least one of size and concentration.

3. Apparatus as defined in claim 1, wherein the pore burner is arranged downstream with regard to the mixing device.

4. Apparatus as defined in claim 1, wherein the mixing device is formed by a mixing path.

5. Apparatus as defined in claim 1, wherein a mass flow regulator is provided for adjusting the mass flow of fuel to the mixing device.

6. Apparatus as defined in claim 1, wherein a mass flow regulator is provided for adjusting the mass flow of oxidizing agent to the mixing device.

7. Apparatus as defined in claim 1, wherein the pore burner comprises a distribution chamber coupled to the mixing device and adjacent to a pore plate.

8. Apparatus as defined in claim 7, wherein the distribution chamber is of a cylindrical design.

9. Apparatus as defined in claim 7, wherein a distribution chamber for inert gas is arranged around the distribution chamber for the mixture of fuel and oxidizing agent.

10. Apparatus as defined in claim 9, wherein the distribution chamber for inert gas is arranged in a ring shape.

11. Apparatus as defined in claim 1, wherein a baffle plate is positioned within said combustion zone and in spaced relation to said pore plate, the baffle plate being positioned such that a combustion flame burns against the baffle plate.

12. Apparatus as defined in claim 11, wherein the baffle plate is arranged parallel to the pore plate.

13. Apparatus as defined in claim 11, wherein the baffle plate has a circular cross section.

14. Apparatus as defined in claim 13, wherein the baffle plate has a greater diameter than the pore plate.

15. Apparatus as defined in claim 1, wherein a chimney or flue is provided.

16. Apparatus as defined in claim 1, wherein an entry aperture of the probe device is positioned at a distance in relation to a pore plate of the pore burner with respect to a vertical direction.

17. Apparatus as defined in claim 1, wherein an entry aperture of the probe device is arranged between a pore plate of the pore burner and a baffle plate.

18. Apparatus as defined in claim 1, wherein an entry aperture of the probe device has a diameter of at least 1.5 mm.

19. Apparatus as defined in claim 1, wherein a diluting device is provided, a defined concentration of soot particles being adjustable by means of said diluting device.

20. Apparatus as defined in claim 1, wherein the analyzer device also functions as a filter device.

21. Apparatus as defined in claim 1, wherein the analyzer device comprises an electrostatic classifier.

22. Apparatus as defined in claim 1, wherein the analyzer device comprises a condensation particle counter.

23. Apparatus for the controlled production of nano-soot particles, comprising:
   a pore burner comprising a combustion zone in fluid communication with a first distribution chamber and a second distribution chamber, wherein said second distribution chamber is separated by a wall from said first distribution chamber and operatively positioned to surround said first distribution chamber, and further comprising a pore plate comprising a plurality of pores, said pore plate operatively arranged to separate said first and second distribution chambers from said combustion zone, wherein the combustion zone is arranged above the pore plate;
   a mixing device in fluid communication with said first distribution chamber and operatively adapted for the production of a pre-mixture of fuel and oxidizing agent;
   an inert gas supply in fluid communication with said second distribution chamber;
   a baffle plate positioned within said combustion zone and in spaced relation to said pore plate;
   a probe positioned within said combustion zone between said pore plate and said baffle plate, said probe operatively adapted for removing a portion of a combustion exhaust gas comprising nano-soot particles from said combustion zone by suction for coupling out a partial flow of produced nano-soot particles, wherein an entry aperture of the probe device is positioned at or in the vicinity of a central area of the combustion zone;
   an analyzer device for measuring the particle size of the nano-soot particles within the partial flow coupled out by the probe; and
   a control device for controlling the mixture of fuel and oxidizing agent, wherein the control device is in communication with the analyzer device and adapted for controlling the mixture of fuel and oxidizing agent as a function of the particle size measured by the analyzer device.

* * * * *